April 28, 1959     H. A. HALSTEAD ET AL     2,884,279
PRISONER CONFINING PARTITION FOR AUTOMOBILES
Filed Dec. 26, 1957     3 Sheets-Sheet 1
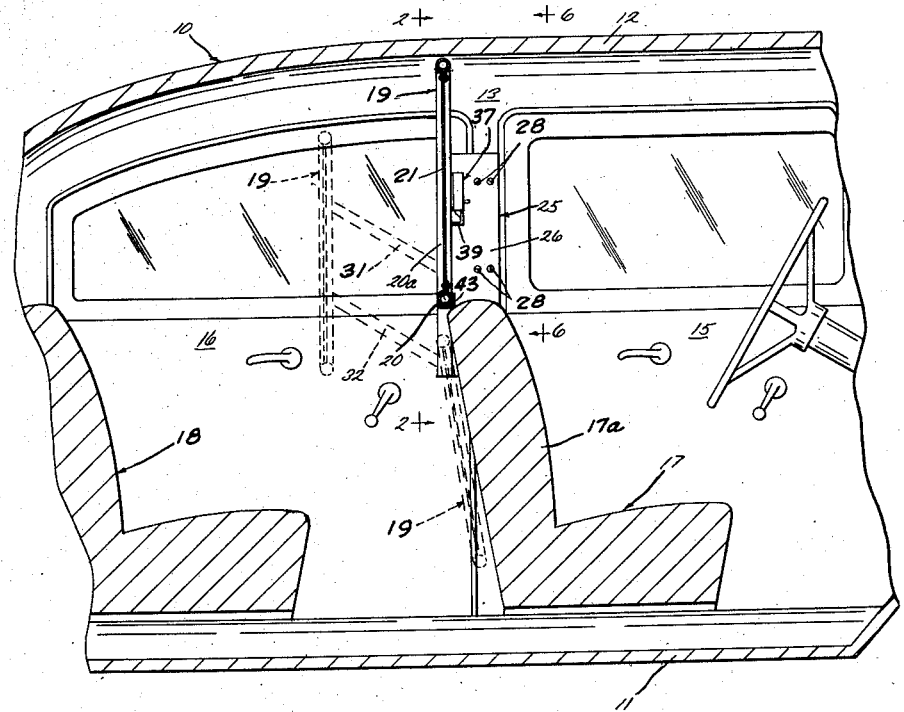
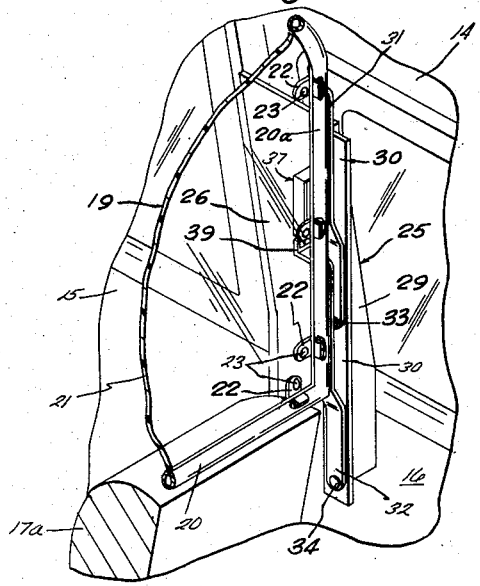
INVENTORS.
Harold A. Halstead
Harold A. Halstead Jr.
Robert E. Halstead
BY
Atty.

April 28, 1959   H. A. HALSTEAD ET AL   2,884,279
PRISONER CONFINING PARTITION FOR AUTOMOBILES
Filed Dec. 26, 1957   3 Sheets-Sheet 2
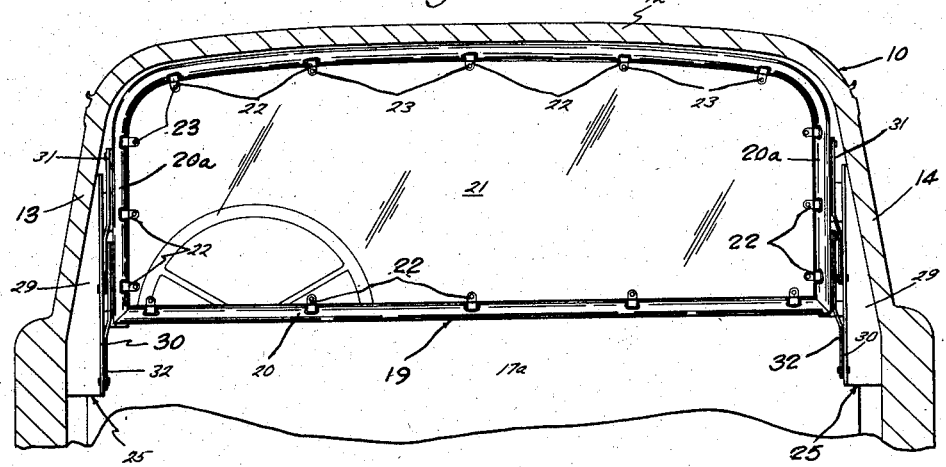
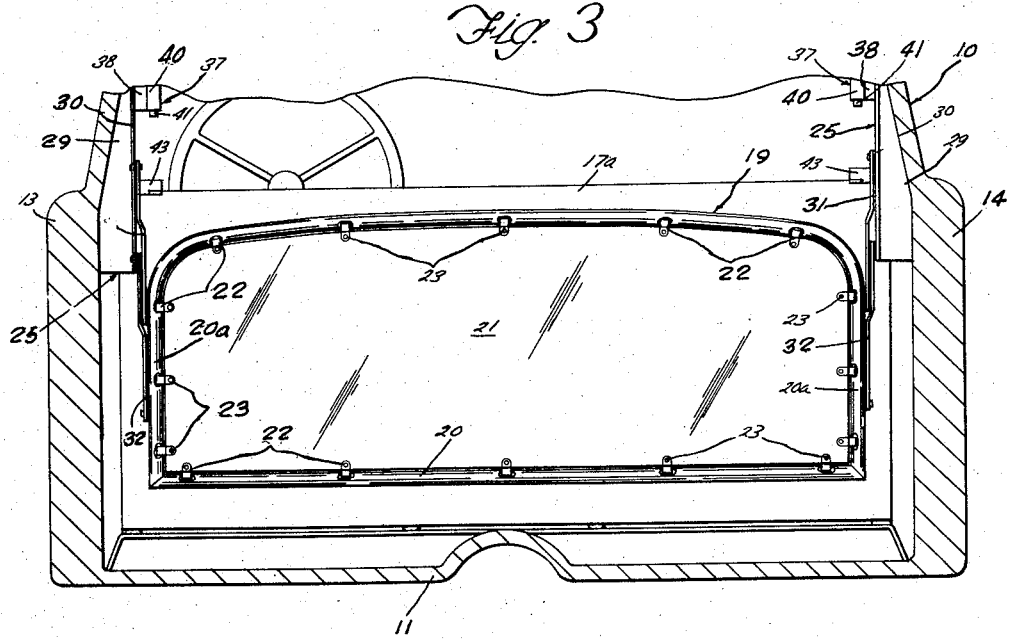
INVENTORS:
Harold A. Halstead
Harold A. Halstead Jr.
Robert E. Halstead
BY
*Truk Wells*
Atty.

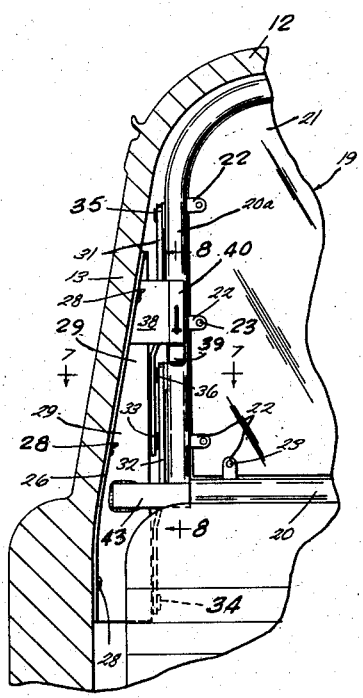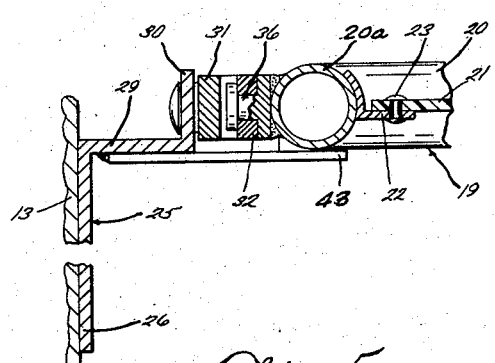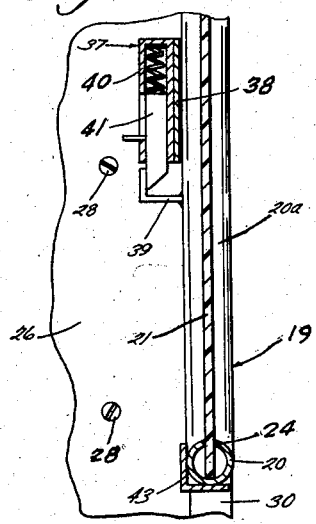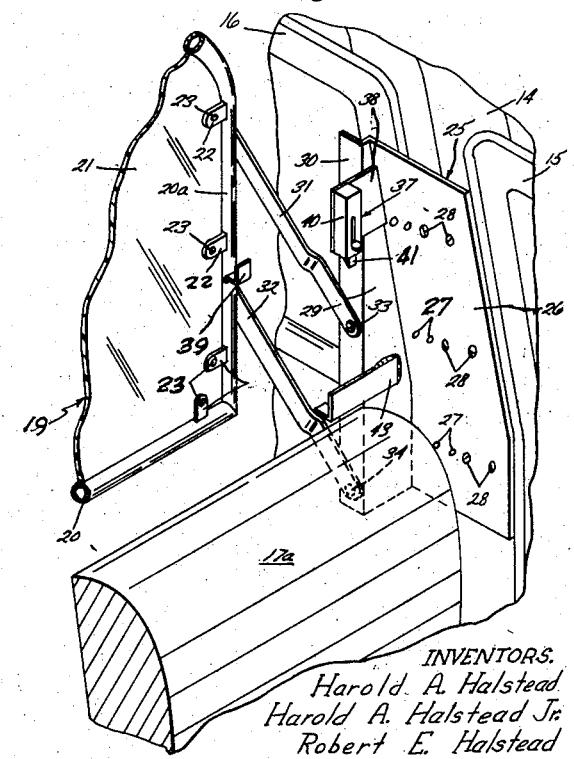
INVENTORS.
Harold A. Halstead
Harold A. Halstead Jr.
Robert E. Halstead
BY
Atty.

United States Patent Office 2,884,279
Patented Apr. 28, 1959

2,884,279

PRISONER CONFINING PARTITION FOR AUTOMOBILES

Harold A. Halstead, Harold A. Halstead, Jr., and Robert E. Halstead, Spokane, Wash., assignors to Novelty Carriage Works, Inc., a corporation of Washington Application December 26, 1957, Serial No. 705,409

4 Claims. (Cl. 296—24)

The present invention relates to improvements in a partition for automobile interiors.

In certain instances it is desirable to separate the front and back seat areas of an automobile interior to isolate persons in the rear seat from the operator of the automobile. For example, in law enforcement work, officers frequently find it necessary to transport prisoners from one location to another in police patrol or prowl cars. At such times it is desirable to have means in the patrol or prowl car to isolate the back seat area from the front seat area to protect the operator of the car from attack from the prisoner or prisoners being transported. This may be easily and effectively accomplished by providing in the car a partition of glass, plastic, wire mesh, or other material which extends from one side of the vehicle to the other between the top of the front seat backrest and the roof of the vehicle. Such a partition effectively isolates the rear seat area from the front seat area, and protects the driver of the car from attacks by the prisoners. A partition of this type, however, if installed as a permanent part of the vehicle, interferes with use of the vehicle for purposes other than transporting prisoners. It is therefore desirable to provide a partition which may be folded down out of the way during normal use of the vehicle and which may be raised into an operative position when the vehicle is to be used for transporting prisoners. It is the principal purpose of the present invention to provide such a partition.

It is a further purpose of the invention to provide with such a partition, unique means for attaching the same to the interior of an automobile for swinging movement between an operative position above the backrest of the front seat and an inoperative position behind the backrest.

The nature and advantages of our invention will appear more fully from the following description and the accompanying drawings wherein a preferred form of the invention is shown. It should be understood, however, that the description and drawings are illustrative only and are not intended to limit the invention except insofar as it is limited by the claims.

In the drawings:

Figure 1 is a vertical cross sectional view of an automobile body showing our improved partition in place to divide the front and rear seat areas;

Figure 2 is a cross sectional view taken substantially on the line 2—2 of Figure 1;

Figure 3 is a sectional view similar to Figure 2, but illustrating the partition swung down behind the front seat in its inoperative position;

Figure 4 is an enlarged fragmentary perspective view showing the partition swung up into operative position to separate the front and rear seat areas;

Figure 5 is an enlarged fragmentary perspective view showing the partition intermediate its operative and inoperative positions;

Figure 6 is an enlarged fragmentary sectional view taken substantially on the line 6—6 of Figure 1;

Figure 7 is an enlarged fragmentary sectional view taken substantially on the line 7—7 of Figure 6; and Figure 8 is an enlarged fragmentary sectional view taken substantially on the line 8—8 of Figure 6.

Referring now to the drawings, and to Figures 1, 2 and 3 in particular, we have shown in Figure 1 an automobile body indicated by the numeral 10, which has a floor 11, a roof 12 and sides 13 and 14. Each of the sides 13 and 14 is provided with a front door 15 and a rear door 16. Inside of the body 10 a front seat 17 and a rear seat 18 are provided.

It is the purpose of this invention to provide a dividing partition which will extend between the side walls 13 and 14 of the body 10, and between the upper edge of the back rest portion 17a of the front seat 17 and the roof 12 of the car to isolate the back seat area of the automobile interior from the front seat area. To accomplish this result we provide a partition element 19 (best shown in Figures 2 and 3) which is shaped to substantially fill the area between the side walls 13 and 14 of the automobile and between the upper edge of the back rest 17a and the roof 12. The partition 19 comprises a tubular framework 20 which supports a glass or clear plastic panel 21 therein. As illustrated in Figure 7 of the drawings, the panel 21 may be supported in the framework 20 by means of inwardly directed brackets 22 which are welded or otherwise affixed to the frame 20 and carry the panel 21 by means of rivets 23. In the alternative, the panel 21 may be inserted into slots 24 provided in the framework 20 as illustrated in Figure 8. In either event, the panel 21 is supported within the framework 20.

To support the partition 19 in the automobile interior, we provide two supporting brackets 25. The brackets 25 are identical except that one is a left hand bracket while the other is a right hand bracket. Each of the brackets 25 comprises a strap portion 26 which is adapted to be positioned against the side wall 13 or 14 of the automobile body 10 between the front and rear doors 15 and 16 and adjacent the upper end of the backrest 17a of the front seat 17, as illustrated in Figures 4, 5 and 6. The strap portions 26 of the brackets 25 have apertures 27 therein which are adapted to receive screws or rivets 28 that secure the brackets 25 to the side walls 13 and 14 of the body 10. Each of the brackets 25 includes an inwardly extending portion 29 connected to and extending at right angles from the strap portion 26. At the free ends of the portions 29, rearwardly extending lips 30 are provided (see Figure 7). Each bracket 25 has two vertically spaced parallel arms 31 and 32 pivoted thereto. As shown in the drawings, the arms 31 and 32 are pivoted to the rearwardly extending lips 30 by pivot pins 33 and 34. The opposite ends of the arms 31 and 32 are pivoted by pivot pins 35 and 36 to the vertical portions 20a of the tubular framework 20 that forms part of the partition 19. The arms 31 and 32 together with the vertical frame portions 20a of the partition 19 and the vertical lips 30 of the brackets 25 form parallelograms at the opposite sides of the partition 19. The arms 31 and 32 at each side of the partition 19 support the partition for swinging movement from the operative position shown in Figures 2, 4 and 6 wherein the partition 19 is positioned between the brackets 25 to isolate the rear seat area of the automobile interior from the front seat area, to the position shown in Figure 3 and in dotted lines in Figure 1 wherein the partition 19 is folded downwardly and rests against the back of the front seat backrest 17a. When the partition 19 is in the position shown in Figure 3 and in dotted lines in Figure 1, it is out of the way where it doesn't interfere with use of the automobile for ordinary purposes.

In order to secure the partition 19 in its operative position, each of the brackets 25 is provided with a latch member 37. As best shown in Figures 5 and 8, the latch members 37 are mounted on ears 38 which project inwardly from the brackets 24 and 25 to position the latch members 37 in alignment with the vertical portions 20a of the tubular frame 20 that forms part of the partition 19. The frame portions 20a are provided with forwardly extending L-shaped hook members 39 which engage with the latch members 37 to secure the partition 19 in its operative position. As shown in Figure 8, the latch members 37 comprise tubular holders 40 having vertical latch pins 41 therein. The latch pins 41 are spring pressed downwardly by springs 42. When the partition 19 is swung upwardly on the arms 31 and 32 to its operative position, the latch pins 41 drop behind the hooks 39 on the partition 19 and secure it against rearward and downward movement. The partition may be released to swing down by moving the latch pins 41 upwardly out of engagement with the hooks 39.

In order to assist the arms 31 and 32 in supporting the partition 19 in its operative position, inwardly extending angle brackets 43 are secured to the brackets 25, as best shown in Figures 5, 7 and 8. The angle brackets 43 provide seats for the partition 19 when it is in its operative position, and take some of the weight of the partition 19 off of the arms 31 and 32.

The partition construction just described provides an extremely simple and useful partition which may be easily raised to isolate the back seat area of an automobile body from the front seat area, and which is operable to fold down out of the way when not in use. The construction of the brackets 25 and latch means 37, 39 is such that when the partition 19 is in its operative position, both the latch means and the screws or rivets which hold the brackets 25 in place are positioned in front of the partition 19 whereby to be wholly inaccessible to persons in the rear seat area. If means are provided to lock the rear doors of the automobile from the outside, a person in the rear seat area may be effectively imprisoned therein.

While we have shown the panel 21 of the partition 19 as being constructed of plastic, it will be understood that many other substances are suitable for this purpose and may be used. The panel may be constructed of wire mesh, or of non-breakable glass, etc. without departing from the spirit of the invention.

We have found that our invention not only provides a satisfactory isolating partition, but also, when swung into operative position, provides a substantial roof strengthening function also. The unique tubular framework 20 acts as a "roll bar" to prevent the roof of the vehicle from caving in on the occupants in the event of upset.

It is believed that the nature and advantages of our invention appear clearly from the foregoing.

Having thus described our invention, we claim:

1. In an automobile body having front and rear seats, the front seat including a backrest extending between the sides of the automobile body, partition means for isolating the back seat area from the front seat area comprising bracket members secured to the sides of the automobile body adjacent the front seat backrest, the brackets including upright inwardly extending portions that project toward each other and provide barriers adjacent the sides of the automobile body, a transverse partition member shaped to fill the area between said brackets and between the upper edge of the backrest and the roof of the automobile body, a pair of vertically spaced parallel lever arms pivoted to each of said bracket members, said lever arms being pivoted to the partition member whereby to maintain the partition in a substantially vertical condition and to support the partition for movement between an operative position between said brackets wherein it fills the area between the upper edge of the front seat backrest and the roof of the automobile and an inoperative position below said brackets and immediately behind the backrest, and cooperating latch means on said brackets and on the partition to lock the partition direct to the brackets in operative position, said latch means being positioned on the front side of the partition member whereby to be inaccessible from the rear seat area when the partition is in operative position.

2. In an automobile body having front and rear seats, the front seat including a backrest extending between the sides of the automobile body, partition means for isolating the back seat area from the front seat area comprising bracket members secured to the sides of the automobile body adjacent the front seat backrest, the brackets including upright inwardly extending portions that project toward each other and provide barriers adjacent the sides of the automobile body, a transverse partition member shaped to fill the area between said brackets and between the upper edge of the backrest and the roof of the automobile body, arm means pivoted to said brackets and to said partition member operable to maintain the partition in vertical position and operable to support the partition member for swinging movement between an operative position between the brackets and filling the space between the upper edge of the backrest and the roof of the automobile and an inoperative position below said brackets and immediately behind the front seat backrest, and cooperating latch members on the partition and on the brackets operable to lock the partition direct to the brackets in operative position, said latch means being positioned on the front side of the partition whereby to be inaccessible from the rear seat area when the partition is in operative position.

3. In an automobile body having front and rear seats, the front seat including a backrest extending between the sides of the automobile body, partition means for isolating the back seat area from the front seat area comprising bracket members secured to the sides of the automobile body adjacent the front seat backrest, the brackets including upright inwardly extending portions that project toward each other and provide barriers adjacent the sides of the automobile body, a transverse partition member shaped to fill the area between said brackets and between the upper edge of the backrest and the roof of the automobile body, arm means pivoted to said brackets and to said partition member operable to maintain the partition in vertical position and operable to support the partition member for swinging movement between an operative position between the brackets and filling the space between the upper edge of the backrest and the roof of the automobile and an inoperative position below said brackets and immediately behind the front seat backrest, inwardly extending bracket means secured to each of said brackets and operable to receive the lower edge of the partition when it is swung into operative position whereby to support the partition against displacement forwardly or downwardly, and cooperating latch members on the partition and on the brackets operable to lock the partition direct to the brackets in operative position, said latch means being positioned on the front side of the partition whereby to be inaccessible from the rear seat area when the partition is in operative position.

4. In an automobile body having front and rear seats, the front seat including a backrest extending between the sides of the automobile body, partition means for isolating the back seat area from the front seat area comprising bracket members secured to the sides of the automobile body adjacent the front seat backrest, a transverse partition member shaped to fill the area between said brackets and between the upper edge of the backrest and the roof of the automobile body, each of said brackets comprising a strap portion affixed to one side of the automobile body, an inwardly extending vertical portion connected to the strap portion along the rear edge thereof, and a rearwardly directed vertical lip portion connected to the inwardly extending portion, arm means pivoted to said rearwardly directed vertical lip portion of each of said brackets and to said partition member operable to maintain the partition in vertical position and operable to support the partition member for swinging movement between an operative position between the brackets and filling the space between the upper edge of the backrest and the roof of the automobile and an inoperative position below said brackets and immediately behind the front seat backrest, and cooperating latch members on the partition and on the brackets operable to lock the partition in operative position, said latch means being positioned on the front side of the partition whereby to be inaccessible from the rear seat area when the partition is in operative position.

References Cited in the file of this patent

UNITED STATES PATENTS

| | | |
|---|---|---|
| 1,011,892 | Williams | Dec. 12, 1911 |
| 2,560,106 | Held | July 10, 1951 |

FOREIGN PATENTS

| | | |
|---|---|---|
| 254,121 | Great Britain | July 1, 1926 |